May 14, 1946.  C. Q. GLASSEY  2,400,346
AIRSPACED SUPPORT
Filed Jan. 6, 1945

COURTNEY Q. GLASSEY
INVENTOR
BY
ATT'Y & AG'T

Patented May 14, 1946

2,400,346

UNITED STATES PATENT OFFICE 2,400,346

AIRSPACED SUPPORT

Courtney Q. Glassey, Rochester, N. Y., assignor to Eastman Kodak Company, Rochester, N. Y., a corporation of New Jersey Application January 6, 1945, Serial No. 571,592

6 Claims. (Cl. 95—8)

This is a continuation in part of Serial No. 493,398 filed July 3, 1943. This invention relates to photographic supports and particularly to airspace supports such as are useful in the color prints described by Hanson and Evans in copending application Serial No. 576,230 filed February 5, 1945.

The present invention has for its objects the provision of an airspace in a photographic sheet material and as such is alternative to the methods described by Murray in copending applications Serial Nos. 571,661 and 571,662, and also in my copending application, Serial No. 571,591, all filed concurrently herewith. The present invention has the advantage of simplified and less expensive manufacturing procedures and also gives enhanced effect especially when used with color prints.

The purpose of this continuation in part application is to include certain limitations as to the thickness of the airspace which are inherent in the invention and which distinguish over prior arrangements which actually have nothing to do with the present invention. For example, U. S. Patent 315,793, Bencke et al., shows a picture layer airspaced from a diffusing layer in order to get a softened appearance due to halation which is exactly opposite to the purpose and effect of the present invention. In the Bencke arrangement, the separation of the picture layer and the diffusing layer is very large, many times the total thickness of ordinary photographic papers so that the scattered light reduces the detail contrast, the sharpness, and the color saturation of the picture giving a softened or "porcelain" appearance. Even in ordinary photographic prints in which the diffusing layer is attached to the picture layer, this effect is not present. For convenience the scattering of light in the Bencke et al. arrangement may be referred to as "primary halation" in which case it should be noted that the effect of "primary halation" in ordinary photographic prints is negligible since the spreading of light thereby is less than the minimum detail of the picture anyway.

However, in ordinary color prints, there is what may be termed "secondary halation" due to multiple internal reflections within the picture layer. This secondary or residual halation is removed by the present invention. The present invention would have no value in any arrangement having an objectionable degree of primary halation. If the separation of the picture and diffusing layers were made greater than 5/1000 of an inch, primary halation due to the Bencke effect would counteract the function of the present invention rendering it inoperative. Preferably this separation should be less than 1/1000 of an inch. Since the airspace must be equal to or less than this separation, these values also constitute the upper limits of the airspace thickness.

The airspace according to the present invention can have any thickness less than that just specified but of course there must be some airspace. Optical contact or even thicknesses less than one or two wave lengths of light introducing interference patterns would not allow the invention to operate properly, but mechanical contact at scattered points, as with a rough textured surface would still permit the operation of the present invention quite satisfactorily. The intermediate areas of course are separated more than one or two wave lengths of light. Therefore the present invention requires the airspace (or other low index medium) to have a thickness greater than .00005 inch and since the separation of the picture and diffusing layers is equal to or greater than the airspace, this is the lower limit of the separation. Thus both the airspace and the separation of the picture and diffusing layers must be between .00005 inch and .005 inch preferably less than .001 inch.

The invention will be fully understood from the following description when read in connection with the accompanying drawing, in which.

Figure 4:
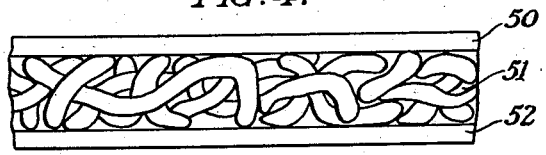
Figure 5:
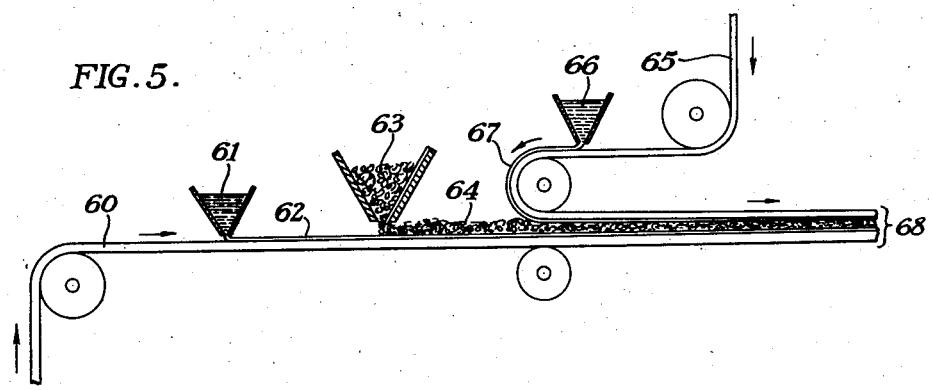

Fig. 4 similarly shows a sheet material for lamination in either color prints or antihalation film;

Fig. 5 shows one method of manufacturing an airspaced photographic material according to the invention.

Figure 1:
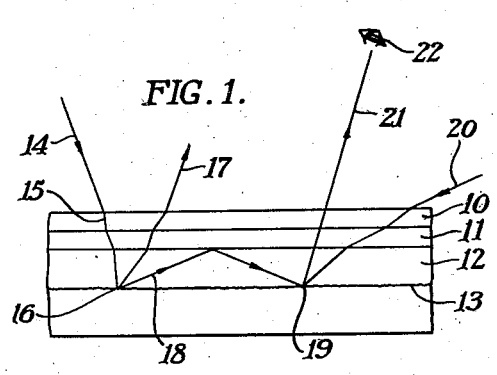
Figs. 1 and 2 illustrate the principle of an airspaced support.

In Fig. 1 a color print is illustrated made up of a multicolor layer 10 separated by an airspace 11 from a light diffusing support 12 which may be paper or film with a white pigment therein, the diffusion being represented by an interface 13 in this layer. The actual diffusion may be from the surface of the layer 12 or the layer may consist of two parts, for example, paper with an overcoating of transparent material. In any case, a light ray passes through the layer 10 and is diffused at the point 16. Any part of that diffused light which reaches the layer 10 again directly must, due to the operation of the airspace 11, pass out through the layer 10 as indicated by the ray 17. This is the normal harmless operation of the light. Other light scattered at the point 16 as illustrated by the ray 18 may be diffused at the point 19 along with a ray 20 also striking this point. The ray 21 thus reaching the eye 22 is made up mainly from light from the ray 20 plus a small percentage of light represented by the ray 18. However, due to the operation of the airspace 11 the ray 18 is colored only by one trip through the layer 10 represented by the section 15 of the ray 14. The airspace 11 prevents the ray 18 from multiple internal reflections within the colored layer 10. If the airspace were not present according to the invention of Hanson and Evans, each ray such as 21 would be diluted by rays such as 18 except that they would have traversed the color layer many times and very obliquely so that they have become highly colored. Thus the layer 10 is a transparent layer, at least its light scattering power, if any, is so small as to be negligible as far as the present invention is concerned and the layer 12 is a translucent one or at least a light diffusing one.

Figure 2:
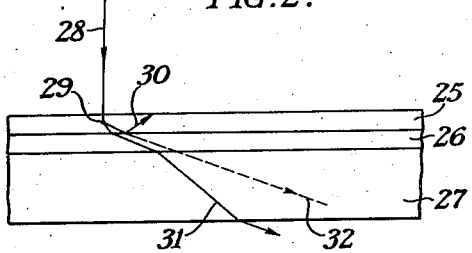

In Fig. 2 a sensitive emulsion 25 which is, of course, a translucent layer is separated by an airspace 26 from a transparent support 27. The purpose of the airspace in this case is to prevent halation. A light ray 28 is diffused somewhere in the emulsion layer 25, say at the point 29, so that one ray 30 is totally and internally reflected until within the layer 25. However, this ray 30 does not travel far from home, and hence, does not cause a large spot of the type known as halation spots. Halation usually occurs when such rays as indicated by the dotted line 32 travel directly through to the base of the film and are totally and internally reflected back to the emulsion layer. On the other hand, another part of the scattered light as represented by the ray 31 is not totally and internally reflected but escapes into the airspace 26 and then enters the base layer 27 and eventually passes through into the air. Due to the airspace 26 every ray which enters the layer 27 passes on through without total internal reflection.

Figure 3:
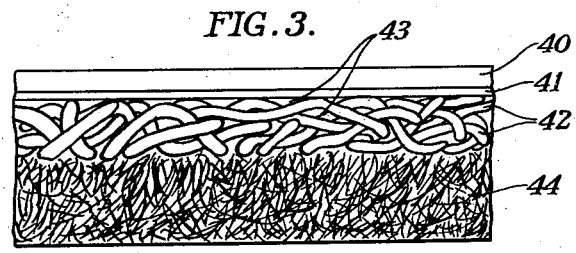
Fig. 3 shows a photographic sheet material in cross section, incorporating one embodiment of the invention.

In Fig. 3 a transparent layer 40, for example, a layer containing a multicolor print or a subbing for such a layer, is attached by adhesive 41 to the ends or sides of large fibers 42 of paper or plastic material. The other ends or sides of these fibers are attached to or imbedded in a light diffusing layer 44 such as paper. The airspace 42 between the fibers constitutes the required airspace for the elimination of unwanted light rays. Preferably the fibers are not so large as to be obtrusively visible, but are large enough to maintain the separation of the transparent and light diffusing layers under normal usage.

In Fig. 4 a layer of such fibers 51 is attached by adhesive to two transparent pellicles 50 and 52 and thus constitutes an inner layer which may be laminated between a transparent layer and a light diffusing layer. For example, such an interlayer may be laminated to film base and then a sensitive photographic emulsion may be coated on the surface of the interlayer. Similarly, an image bearing layer may be laminated on one surface of this interlayer and paper or other light diffusing support laminated on the other surface thereof.

In each of the figures the front interface of the air layer is smooth, substantially parallel to the front surface of the picture layer and non-diffusing. If this interface were diffusing as it probably is in the Bencke arrangement referred to above, the primary halation would be extended and also there would no longer be complete elimination of the secondary halation as by the present invention.

In Fig. 5 a sheet material 60 is passed under a hopper containing an adhesive 61 so that an adhesive layer 62 is coated thereon. After this adhesive has set sufficiently, the combination passes under a hopper containing curved fibers 63 of paper or plastic which are spread to form a porous fibrous layer 64 on the adhesive layer 62. Another sheet material 65 receives an adhesive layer 67 from a hopper 66 and is then passed with not too heavy a pressure into contact with the porous fibrous layer 64 ultimately forming a sheet material 68 having an effective airspace interlayer. Either sheet material 60 or 65 may be light diffusing or both may be transparent. The resulting sheet material may be laminated between other layers as in the case of Fig. 4 or may be the final product itself if, for example, when the sheet 65 contains a multicolor image and the sheet 60 is light diffusing.

In an alternative embodiment, a light diffusing support such as paper is manufactured so that its surface has large fibers extending therefrom. An upper transparent layer which may be the one containing the multi-colored image or which may be a transparent pellicle which is later to support a multicolored image is then fastened to the upper ends of the fibers in the same way that the layer 65 is attached by adhesive 67 to the fibrous layer 64.

Having thus described the preferred embodiments of my invention, I wish to point out that it is not limited to these structures but is of the scope of the appended claims.

What I claim and desire to secure by Letters Patent of the United States is:

1. A photographic sheet material comprising a transparent layer, a light diffusing layer and between the two layers a porous, fibrous layer adhering to both of the other layers, the separation of the transparent and diffusing layers and the thickness of the porous layer both being between .00005 inch and .005 inch.

2. A sheet material according to claim 1 in which the light diffusing layer is a sensitive emulsion on a thin pellicle and the transparent layer is a support for the emulsion.

3. A sheet material according to claim 1 in which the transparent layer contains a multicolored picture and the light diffusing layer is a support for the picture.

4. A sheet material according to claim 1 in which the fibers of the interlayer are a coarse paper fiber.

5. A sheet material according to claim 1 in which the fibers of the interlayer are fibers of plastic.

6. A sheet material according to claim 1 in which the fibers of the interlayer are curved.

COURTNEY Q. GLASSEY.